US009194157B2

(12) United States Patent
Bahar

(10) Patent No.: US 9,194,157 B2
(45) Date of Patent: Nov. 24, 2015

(54) METHOD AND SYSTEM FOR REAL ESTATE MARKETING

(76) Inventor: Reuben Bahar, West Hills, CA (US)

(*) Notice: Subject to any disclaimer, the term of this patent is extended or adjusted under 35 U.S.C. 154(b) by 1294 days.

(21) Appl. No.: 12/660,647

(22) Filed: Mar. 1, 2010

(65) Prior Publication Data

US 2010/0223170 A1 Sep. 2, 2010

Related U.S. Application Data

(60) Provisional application No. 61/208,833, filed on Feb. 27, 2009.

(51) Int. Cl.

| | |
|---|---|
| *G06Q 10/00* | (2012.01) |
| *G06Q 30/00* | (2012.01) |
| *G06Q 50/00* | (2012.01) |
| *G06Q 99/00* | (2006.01) |
| *E05B 19/00* | (2006.01) |
| *G06Q 10/06* | (2012.01) |
| *G06Q 50/16* | (2012.01) |
| *G06Q 20/40* | (2012.01) |
| *G06Q 30/02* | (2012.01) |
| *G06Q 30/04* | (2012.01) |
| *G06Q 50/26* | (2012.01) |
| *G07C 9/00* | (2006.01) |
| *G08B 13/196* | (2006.01) |

(52) U.S. Cl.
CPC .......... *E05B 19/0005* (2013.01); *G06Q 10/063* (2013.01); *G06Q 20/40* (2013.01); *G06Q 30/02* (2013.01); *G06Q 30/04* (2013.01); *G06Q 50/16* (2013.01); *G06Q 50/163* (2013.01); *G06Q 50/265* (2013.01); *G07C 9/00142* (2013.01); *G08B 13/196* (2013.01); *G07C 9/00158* (2013.01)

(58) Field of Classification Search
None
See application file for complete search history.

(56) References Cited

U.S. PATENT DOCUMENTS

| | | | | |
|---|---|---|---|---|
| 4,838,052 | A * | 6/1989 | Williams et al. | 70/63 |
| 5,231,569 | A * | 7/1993 | Myatt et al. | 705/38 |
| 5,280,518 | A * | 1/1994 | Danler et al. | 379/102.06 |
| 5,737,947 | A * | 4/1998 | Ling | 70/63 |
| 6,975,220 | B1 * | 12/2005 | Foodman et al. | 340/531 |
| 7,120,935 | B2 | 10/2006 | Serani et al. | |
| 7,193,503 | B2 | 3/2007 | Fisher | |
| 7,734,068 | B2 * | 6/2010 | Fisher | 382/115 |
| 2004/0025039 | A1 | 2/2004 | Kuenzi et al. | |
| 2004/0219903 | A1 | 11/2004 | Despain et al. | |
| 2005/0155396 | A1 * | 7/2005 | Taljaard et al. | 70/56 |
| 2005/0168320 | A1 * | 8/2005 | Henderson et al. | 340/5.25 |
| 2006/0236407 | A1 | 10/2006 | Mergenthaler | |
| 2008/0154774 | A1 | 6/2008 | Dennison et al. | |
| 2009/0030718 | A1 * | 1/2009 | Bengson | 705/1 |
| 2009/0151402 | A1 * | 6/2009 | Lee | 70/25 |
| 2009/0200373 | A1 * | 8/2009 | Landwirth et al. | 235/382 |
| 2010/0268379 | A1 * | 10/2010 | Woodard et al. | 700/237 |

* cited by examiner

*Primary Examiner* — Peter L Ludwig
(74) *Attorney, Agent, or Firm* — Cahill Glazer PLC

(57) ABSTRACT

A method and system for real estate marketing allows individuals from the general public to gain access to a real estate property that is placed for sale or lease for the purpose of inspection. Access to the real estate property may be granted to requesting individuals who hold valid user accounts with a Remote Service Provider which can authorize such access. Access to inspect real estate property may be granted based on a charged fee basis and can be monitored via video and/or audio surveillance equipment to safeguard against vandalism and/or inappropriate conduct at the property location.

27 Claims, 5 Drawing Sheets

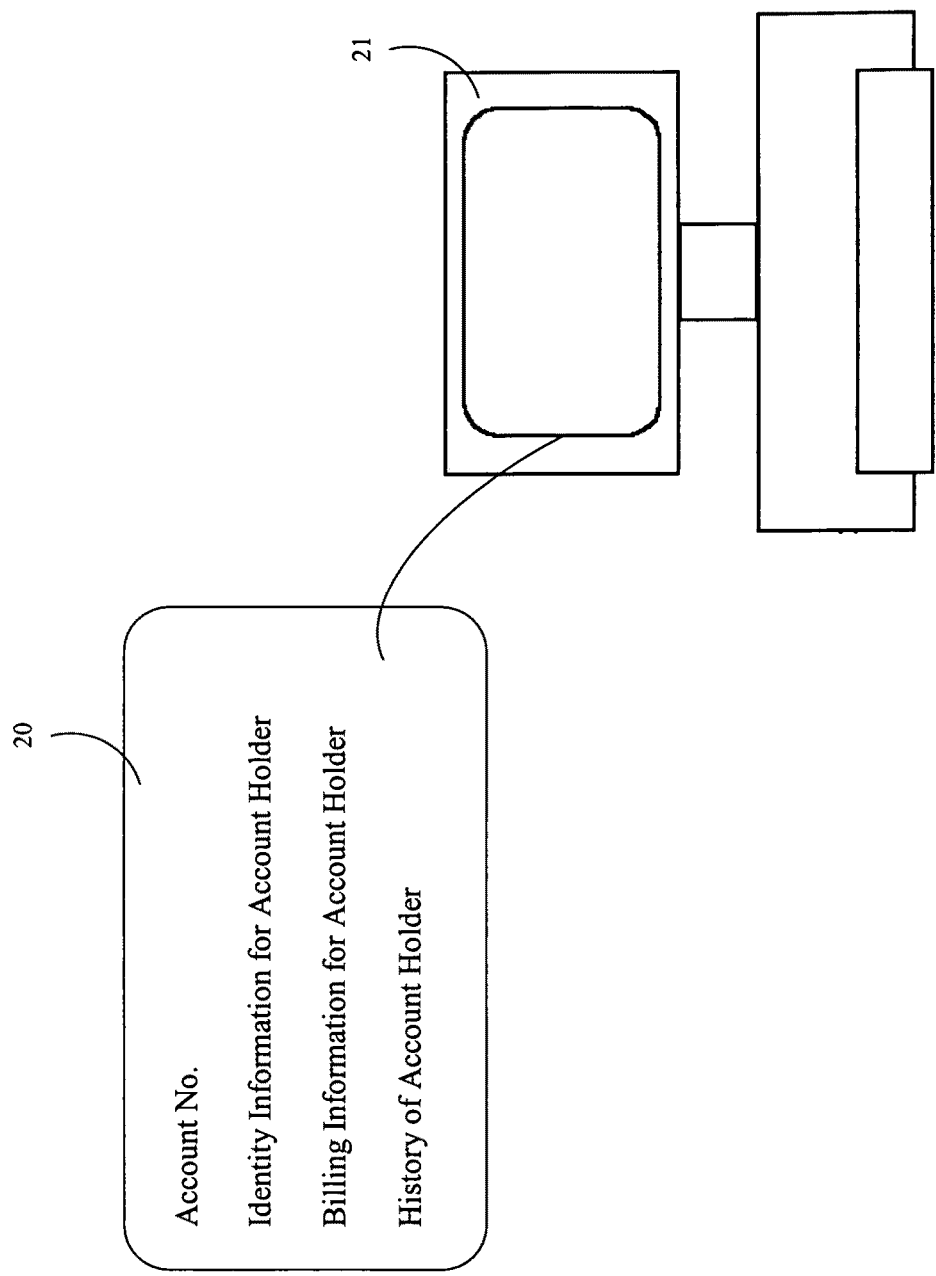

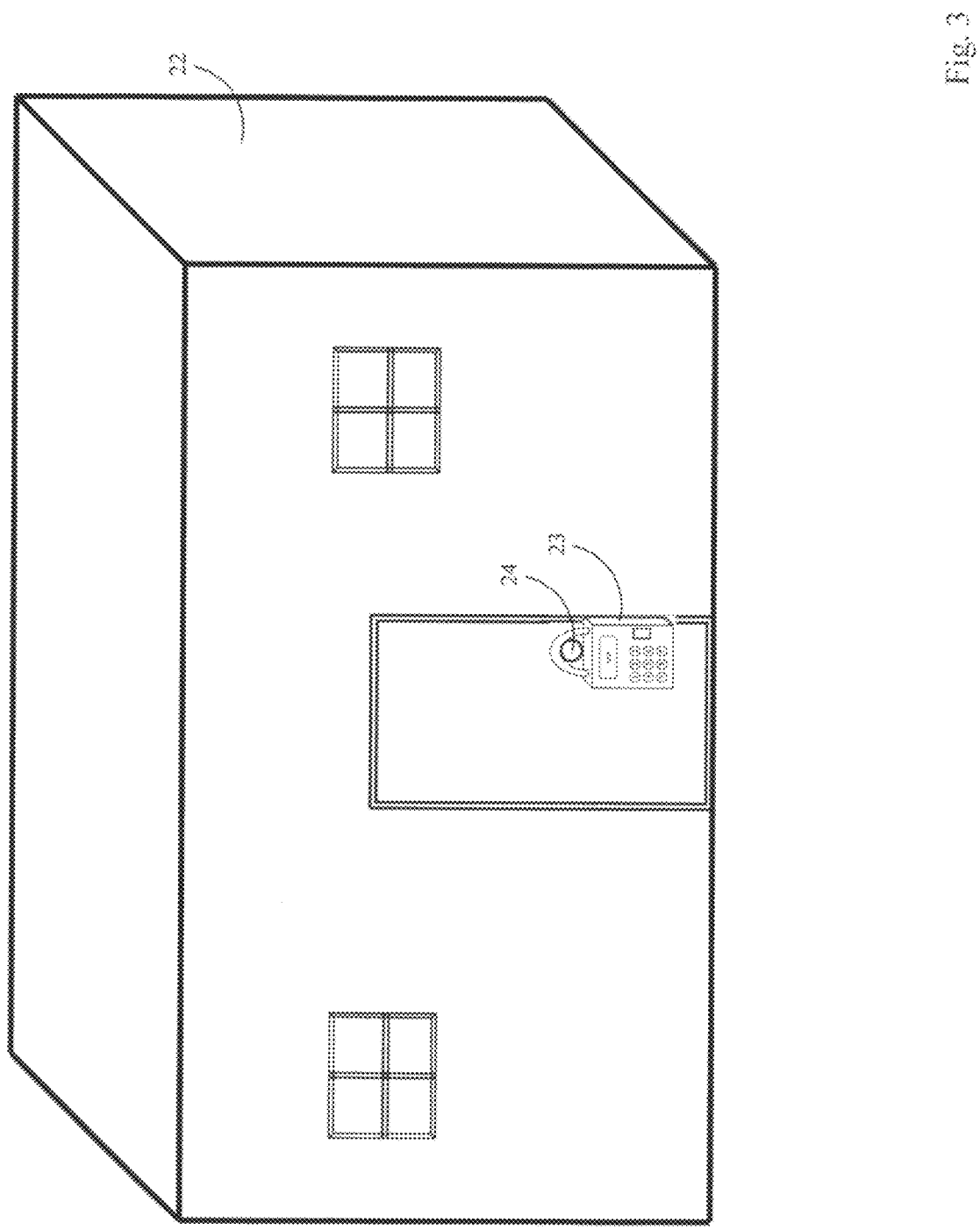



METHOD AND SYSTEM FOR REAL ESTATE MARKETING

CROSS REFERENCE TO RELATED APPLICATION

This application claims priority to U.S. provisional application Ser. No. 61/208,833 filed Feb. 27, 2009 titled "Method and System for Real Estate Marketing," the disclosure of which is hereby incorporated by reference in its entirety.

BRIEF SUMMARY OF THE INVENTION

The present invention is for a method and system for real estate marketing comprising allowing the general public to gain access to the inside of an enclosed real estate property such as a home, apartment, or commercial building, that is placed for sale or rent, ("market property") without a real estate agent, but in a secure manner. The inventive method preferably comprises requiring an individual or entity ("perspective buyer" or "consumer"), desiring to gain access to a property, to obtain an entry access via a code, card, or other token from a remote service provider. According to one embodiment, an access code will allow the perspective buyer to access a key that is stored inside an entry key lockbox located at the property or to otherwise activate a keyless lock. Preferably, the inventive system further comprises requiring the perspective buyer to establish an account with a remote service provider who can provide the access code to a building key lockbox upon request from the perspective buyer or renter. Once granted access a video and/or audio surveillance system may be activated in order to monitor the individual's inspection of the property and deter against vandalism and/or inappropriate conduct. Granted access codes may be charged a fee to the perspective buyer or renter based on a per request basis or membership account basis, and/or a fee may be charged to the seller. In this manner, individuals from the general public will be able to gain access to the inside of a building without the need of a broker or listing agent to accompany them. Individuals from the general public includes people who are not licensed as real estate agents and/or brokers (also referred to as "non-licensed individuals"). As a result, property placed for sale or rent will be capable of being inspected by interested parties on a much higher volume which will likely result in a shorter waiting period for the seller or lessor.

BRIEF DESCRIPTION OF THE DRAWINGS

FIG. 2 is a screen shot of various account information pertaining to an individual that has a registered account with the Remote Service Provider.

FIG. 3 is a perspective diagram of a building structure that utilizes the method and system described herein.

BACKGROUND

Figure 1:
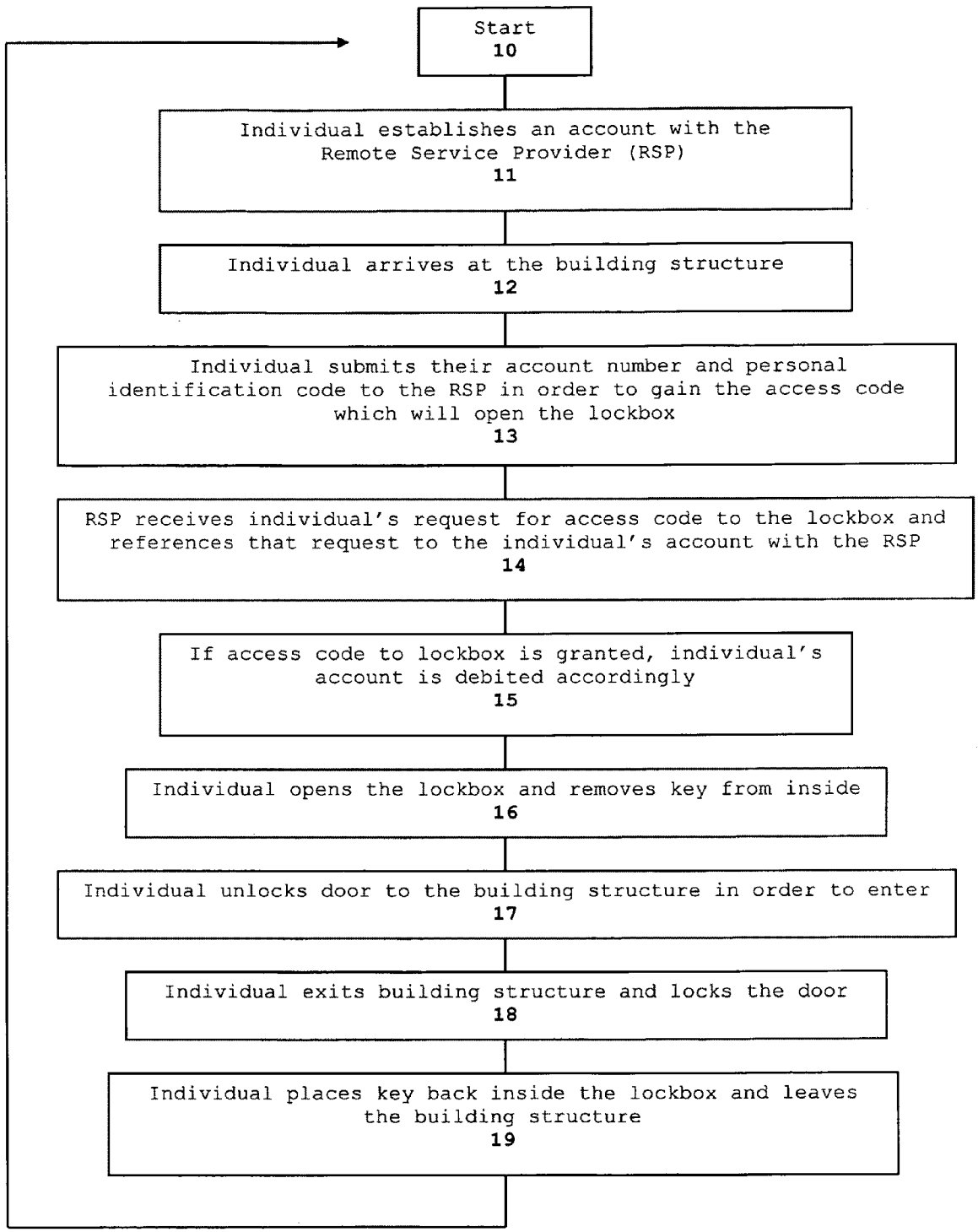
FIG. 1 is flow chart that depicts one embodiment of the method and system described herein.

Individuals wanting to view real estate comprising an enclosed property structure, such as a home or commercial property have only been able to do so when accompanied by a broker or listing agent absent an appointment or times of public showing. Although the agent provides a measure of security to the seller against property harm, such as vandalism or squatting, this has made it inconvenient for potential buyers or renters to view the property. As a result, real property experiences less exposure from potential buyers or renters who are often too busy to coordinate their schedules with a broker or listing agent. Due to the vast amount of available real estate as well as variable time schedules of buyers and renters, there is a need for a method and system to allow individuals in the general public (which includes people who are not licensed as real estate agents and/or brokers (also referred to as "non-licensed individuals") to access building structures that are placed for sale or rent without the requirement of being accompanied by a broker or listing agent.

DETAILED DESCRIPTION OF THE PREFERRED EMBODIMENTS

The detailed description set forth below is intended as a description of exemplary embodiments and is not intended to represent the only forms in which the exemplary embodiments may be constructed and/or utilized. The description sets forth the functions and the sequence of steps for constructing and/or operating the exemplary embodiments. However, it is to be understood that the same or equivalent functions and sequences may be accomplished by different exemplary methods and are also intended to be encompassed within the spirit and scope of the invention, and within the scope and judgment of the skilled person.

Definitions:

The term "seller" shall include a seller, lessor, or auctioneer of any type of real estate interest;

The term "market property" shall include a real estate property comprising an enclosed structure such as a home, apartment, or commercial building, that is placed for sale, rent, or auction.

The terms "prospective buyer", "consumer", or "requesting individual" shall include an individual or entity interested in viewing a market property for the purpose of buying, leasing, investing or other type of commercial interest.

The term "entry access" shall encompass any method of opening a locked door and/or other entrance gate in order to gain access to an enclosed property structure; examples of methods of gaining entry access include, but are not limited to, entering a code, password, combination, other private information, providing biometric data, inserting a card or other token, and/or using a key which enables entry access into the structure. The structure may include a lock box containing a key, the structure itself, a keyless lock (i.e. card activated), etc. which may be unlocked via any of the above methods.

The inventive real estate marketing method and/or system comprises providing direct consumer access into a market property without necessitating the presence of a second party agent or seller, and with reasonable degree of assurance that the property will not be harmed (e.g. vandalized robbed, squatted upon, etc.). According to a preferred embodiment, the method comprises 1) indicating or listing a market property or a plurality of market properties to be accessible for viewing independently and/or directly by a perspective buyer, 2) establishing a secure protocol which provides reasonable assurance that a specific perspective buyer can independently view the property without the property being harmed; 3) allowing independent property entry access to the specific perspective buyer, and 4) optionally charging a fee to the perspective buyer, seller, and/or both; wherein the fee may be charged for allowing access to the property, listing the property, selling the property, or a combination thereof.

Compilation of Market Properties

The method and system of the present invention provides prospective buyers access to a large number of properties. Examples of provider/seller entities who may provide and/or add to a compilation of market properties and/or control user access to the method and system include, but are not limited to a seller entity that preferably owns a large number of properties such as a bank, or other enterprise owning a large number of properties; an agent or agency company for seller (s), such as a real estate brokerage company, apartment management company, a real estate auctioneer, etc., or an independent service provider establishing such service for property owners. Additionally, the inventive system preferably utilizes a personal computer system, personal or office network, and/or internet for maintaining and marketing a compilation of market properties.

Secure Protocol

The present invention includes a secure protocol which may be controlled by a service provider, brokerage company, seller, lessor, and/or an independent party. Such secure protocol may include, but is not contingent upon nor limited to any of the following: 1) screening of prospective buyers including obtaining identification information pertaining to prospective buyers; 2) obtaining an insurance deposit from prospective buyers; 3) issuing a code, password, and/or access card/token for gaining access to the market property; 4) obtaining biometric data sample for gaining access to the market property; 5) use of security system devices such as a video camera recorders, audio surveillance equipment, and/or motion sensors; 6) or a combination of the above.

According to an illustrative embodiment shown in FIG. 1, the method and system works to allow pre-approved individuals from the general public the ability to inspect the inside of a building structure without the need of having a broker agent accompany them. Individuals from the general public includes people who are not licensed as real estate agents and/or brokers (also referred to as "non-licensed individuals"). Preferably, individuals from the public are required to establish personal accounts with a Remote Service Provider (hereinafter, "RSP"). Upon receiving a request from a registered member, the RSP would be able to reference that individual's account information and grant them the access code to the lockbox. Since each requesting individual would have an established account with the RSP, the identity of the individual requesting entry access to the building structure would be known. Upon giving the requesting individual the access code to the building structure's lockbox, the RSP would debit that individual for their requested access. Debiting may be done to the individual's account that is maintained with the RSP on a per request or membership fee basis.

An example of this embodiment is illustrated in the general flowchart of FIG. 1. Beginning at block 10 and moving to block 11, an individual from the general public (which includes "non-licensed individuals" who are individuals from the general public who are not licensed real estate brokers and/or agents) must first establish an account with the RSP. It is preferred that each account be personal to the particular individual registered under it and that it only be accessible by them. After an account is established, the individual may arrive at a building structure (block 12) and submit their personal identification code to the RSP in order to get the access code which will open the lockbox (block 13). After receiving the individual's request, the RSP references the individual's account (block 14). If the access code to the lockbox is granted, the individual's account is debited accordingly (block 15). At this point, the individual uses the access code to open the lockbox and retrieve the key to the building structure (block 16). The door to the building structure is then unlocked (block 17) and the individual enters in order to look at the inside premises. Once finished, the individual exits the building structure and locks the entry door (block 18). The individual then places the entry key back into the lockbox and leaves the building structure (block 19).

It is noteworthy that individuals in the general public who hold accounts with the RSP may repeat this cycle with numerous different building structures, with each occurrence resulting in a debit to their account with the RSP. Debiting of the individual's account would produce revenue for the RSP as well as work to focus the interest of individuals on property that they are truly interested in buying or renting. Use of this method and system will allow individual in the general public to conveniently inspect building structures that they are interested in buying or renting without the need of being accompanied by a housing broker or listing agent. Owners of the listed building structure(s) will benefit by having their property inspected by interested individuals at a much greater occurrence then would normally be the case had such individuals needed to schedule viewing appointments with brokers or listing agents. As a result, building structures would not only sell or rent faster, but may do so at higher prices to the property owner due to the increase of people interested in the property.

In describing the method and system in greater detail, various blocks in FIG. 1 can be elaborated upon. As indicated in Block 11, FIG. 1, an individual from the general public first establishes an account with the RSP. It is preferred that each established account have a unique account number and be personal to and accessible only by the individual establishing such account. In doing this, the individual would have to provide identity information to the RSP which will work to positively identify such individual. As shown in FIG. 2, a computer screen shot 20 is displayed from a computer of the RSP 21. There, account information pertaining to the individual wishing to establish an account with the RSP can include, but is not limited to the following:

1) Identity information: Identity information of the account holder may include, but is not limited to the following: name, address of residence, contact phone number(s), e-mail address, age, gender, drivers license number, social security number, biometric imprint (such as a fingerprint, voice identification, retinal identification, etc.), work address, profession, etc. Identity information may further consist of a security password and/or question and answer set that is only known to and by the individual holder of the account.

2) Billing information: Billing information will allow the RSP to debt the individual for requested access codes to a particular building structure. Billing information for the individual can include a credit or debit card account number and particulars, a bank account number and particulars, a pre-paid balance account, or other type of payment method.

Billing for granted access codes to enter and view building structures can be done in a number of ways. In one embodiment, billing can be done on a per entry basis where the individual is debited or charged a pre-determined fee for each granted access code for a building structure. For example, the RSP may bill $5.00 each time that the access code to a building structure is granted. Alternatively, the individual may pay a daily, weekly, monthly, or yearly subscription fee in which they are given a predetermined number of access codes which can be consumed during the subscription period. Such membership fee can be re-occurring over the predetermined time period wherein the predetermined number of access codes granted for the particular time period can be replenished. A third billing method can allow the individual to pre-pay for a certain amount of access codes. Upon each request for an access code, the individual's available pre-paid access code credits will be decremented by one.

3) History information: History information will allow the RSP to keep an active record on the individual's account history. History can include, but is not limited to the amount of access code requests, the location of the building structure(s) for which such requests were made, payment history, and negative feedback on a particular individual's conduct in using this method and system.

Attaining identity, billing, and history information on the individual requesting an account with the RSP will not only allow the RSP to bill them for access codes given for entry into a particular building structure, but will also establish a measure of security for property owners. Knowledge of the identity of the individual requesting access to a building structure, along with their billing information will ensure that they conduct their inspection of the property in a professional manner and be responsible for the premises during their time of entry and inspection. As an optional measure for security, it is further contemplated that the RSP may perform a background check on the individual requesting to establish an account before such account is established. Background checks may be used to determine if the individual has a criminal history, pending litigation, etc. Additionally, the RSP may even require references from associates and/or family members of the individual prior to approving an account for them.

Once approved, an individual will be given a personal account number which is used to reference their account. The account number can be any sequence of numbers or letters that is unique to the individual's account. Additionally, the individual will be given or asked to provide a primary personal identification code (such as a password) that will grant them access to their account. The personal identification code can be any random sequence of alphanumeric characters, the individual's social security number, or part of it, the individual's driver's license number, a password, a security question, a biometric imprint, or any combination of these. Furthermore, the access to the account can be conditioned on a secondary personal identification code for establishing an added measure of security.

After an account is established with the RSP, the individual may arrive at a building structure, as noted in block 12, FIG. 1. As is typically the case, the building structure placed for sale or rent has a lockbox attached to it or within its vicinity. An example of this is shown in FIG. 3, where building structure 22 has a lockbox 23 that is attached to the structure's door handle 24. In order to enter the building structure, the individual will have to get the access code from the RSP in order to open the lockbox 23 which has the entry key to the building structure 22 stored inside. Similarly, if the building structure has a keyless entry door lock (not shown) instead of a lockbox 23, the access code will likewise be needed in order to access such door lock.

Figure 4B:
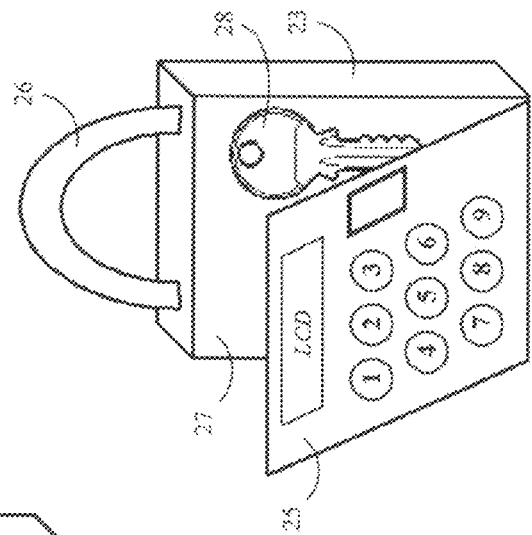
FIG. 4B is a perspective view of the lockbox of FIG. 4A with its front cover in the open position.
Figure 4A:
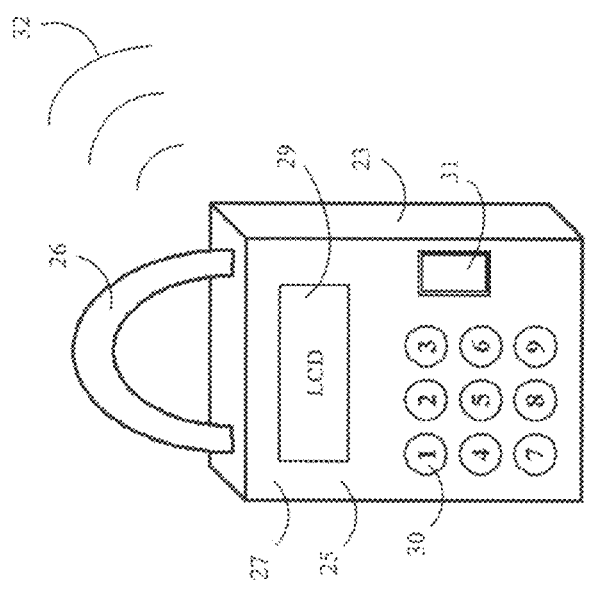
FIG. 4A is a perspective view of one embodiment of a lockbox that can be used with the method and system described herein.
Figure 4C:
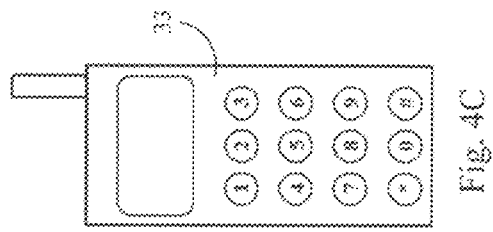
FIG. 4C is a perspective diagram of a cellular phone that can be used with the method and system described herein.
Figure 4D:
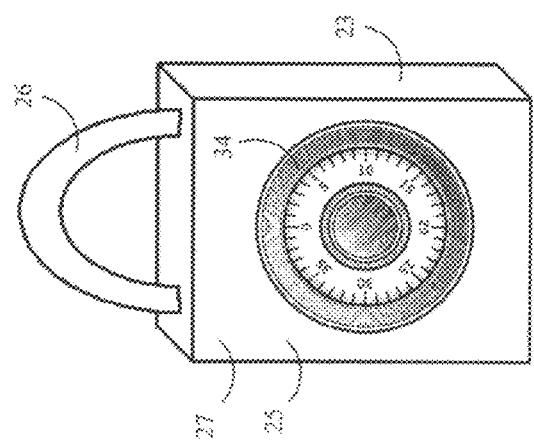
FIG. 4D is yet another embodiment of a lockbox that can used with the method and system described herein.

At this point, the individual will submit their account number to the RSP along with their personal identification code in order to gain the access code for opening the lockbox, FIG. 1, block 13. Submission of the account number and personal identification code to the RSP may be done in a number of different ways. Such data can be directly inputted into the lockbox 23 if it is capable of receiving such data. As shown in FIG. 4A, lockbox 23 is one such device. There, lockbox 23 has a front cover 25 and metal lock 26 and an inside compartment 27 which is shown in the closed position. As is typically used in the industry, lockbox 23 is used to store an access key 28 which provides entry access to the building structure the lockbox 23 is attached to. Upon correct input of the access code to the lockbox 23, an individual can open the lockbox 23 (as shown in FIG. 4B in which front cover 25 is in the open position) and gain access to the key 28 stored inside. Thereafter, the individual can use key 28 to access the particular building structure that is placed for sale or rent. Although key 28 is shown as a conventional metal key, it can likewise be an electronic data card or other token that can be used to open the door lock of the building structure. If the building structure has a keyless entry door lock (not shown) instead of a lockbox 23, the access code (once attained) will likewise enable the individual to gain entry into the building structure by inputting such access code into the keyless entry door lock.

As further shown in FIG. 4A, lockbox 23 has an LCD display 29, alphanumeric keypad 30, fingerprint scanner 31, and is configured to communicate through wireless technology 32. Through these features (e.g. alphanumeric keypad 30 and/or fingerprint scanner 31), an individual can input their account number and personal identification code/data into lockbox 23. This data would thereafter be transmitted from the lockbox 23 to the RSP via wireless technology 18. Upon receipt of this data, the RSP would reference such request to the individual's account, FIG. 1, block 14, and determine whether to grant the access code. If the access code is granted, FIG. 1, block 15, the individual's account is debited accordingly.

It is noteworthy that the method and system described herein can similarly function to provide the requesting individual with the access code to the lockbox 23 without having the individual's account number and/or personal identification code inputted directly into the lockbox 23. In an alternative embodiment, the requesting individual may use their cellular phone 33, FIG. 4 (or similar communication device) to call the RSP and/or transmit their account number and/or personal identification data to the RSP by inputting such data directly into the phone rather then into the lockbox 23. The RSP can similarly transmit the lockbox 23 access code back to the individual's cell phone 33 after access is approved. In yet another embodiment, the requesting individual may use their cellular phone 33, FIG. 4, or land line telephone to call the RSP in order to speak to a representative of the RSP. After verifying the appropriate information from the requesting individual, the representative at the RSP may give the requesting individual the lockbox 23 access code and debit their account accordingly. The lockbox access code may be looked up (and/or discovered) from stored data in the computer system of the RSP by the RSP representative. The representative may thereafter manually give the access code to the requesting individual via communication over the cell phone (i.e. by verbally disclosing/communicating the code over the phone), or by electronically transmitting/communicating it to the requesting individual's cell phone or directly to the appropriate lockbox (via a data packet transmission). Alternatively, the access code may be automatically discovered and/or generated by the computer system of the RSP and automatically transmitted/communicated to the requesting individual's cell phone or directly to the appropriate lock box (via data packet transmission). In this embodiment, the assistance of a representative from the RSP may not even be needed, whereby the entire discovery/generation and/or transmission/communication of the access code is run automatically by the computer system of the RSP. Thus, while it has been discussed that the RSP will give the requesting individual the lockbox 23 access code upon approval, it may similarly transmitted directly to the individual's cell phone or lockbox 23 via wireless technology (if the lockbox is configured to operate as such) and automatically cause the lockbox 23 to unlock so that key 28 can be removed from inside compartment 27.

Given the various methods in which the requesting individual can attain the access code for accessing the lockbox 23, it must be noted that the method and system described herein can function with any type of lockbox 23 that is available on the market (i.e. electronic and mechanical). Thus, lockbox 23 can be electronic with features as described in FIGS. 4A and 4B, as well as completely mechanical without the ability to function via any electronic technology, including, but not limited to wireless technology. An example of a mechanical lockbox 23 can be seen in FIG. 4D where a turn wheel tumble lock 34 must be spun (in alternating left and right directions) to a particular code in order to open the front cover 25 and gain access to the inside compartment 27.

It should furthermore be mentioned that there may be instances where the RSP will not approve of granting the requesting individual the access code to the lockbox 23 at the time of their request. Such may happen for various reasons which include, but are not limited to the following: the individual's account is in bad standing due to unpaid or 0 credits available for receiving lockbox access codes, negative history reported on the individual requesting access code to lockbox 23, suspected fraud from the individual requesting the access code to lockbox 23, the building structure is no longer for sale or rent, individual requesting access is doing so at a date or time when access is not allowed (e.g. after 5 Pm at night), etc.

Once the requesting individual receives the access code for the lockbox 23, they may use the code to open the lockbox 23 and remove the key 28 that is inside, FIG. 1, block 16. As an option for convenience or added cost to the requesting individual, the RSP may automatically send the requesting individual an e-mail which contains detailed information about the property that they have just gotten access to. This e-mail can contain the property sale or rental price, particulars about square footage, features of the property, and contact information in case of interest. With the key 28 in their hand, the requesting individual may unlock the door to the building structure 22 and enter it, FIG. 1, block 17.

Figure 5:
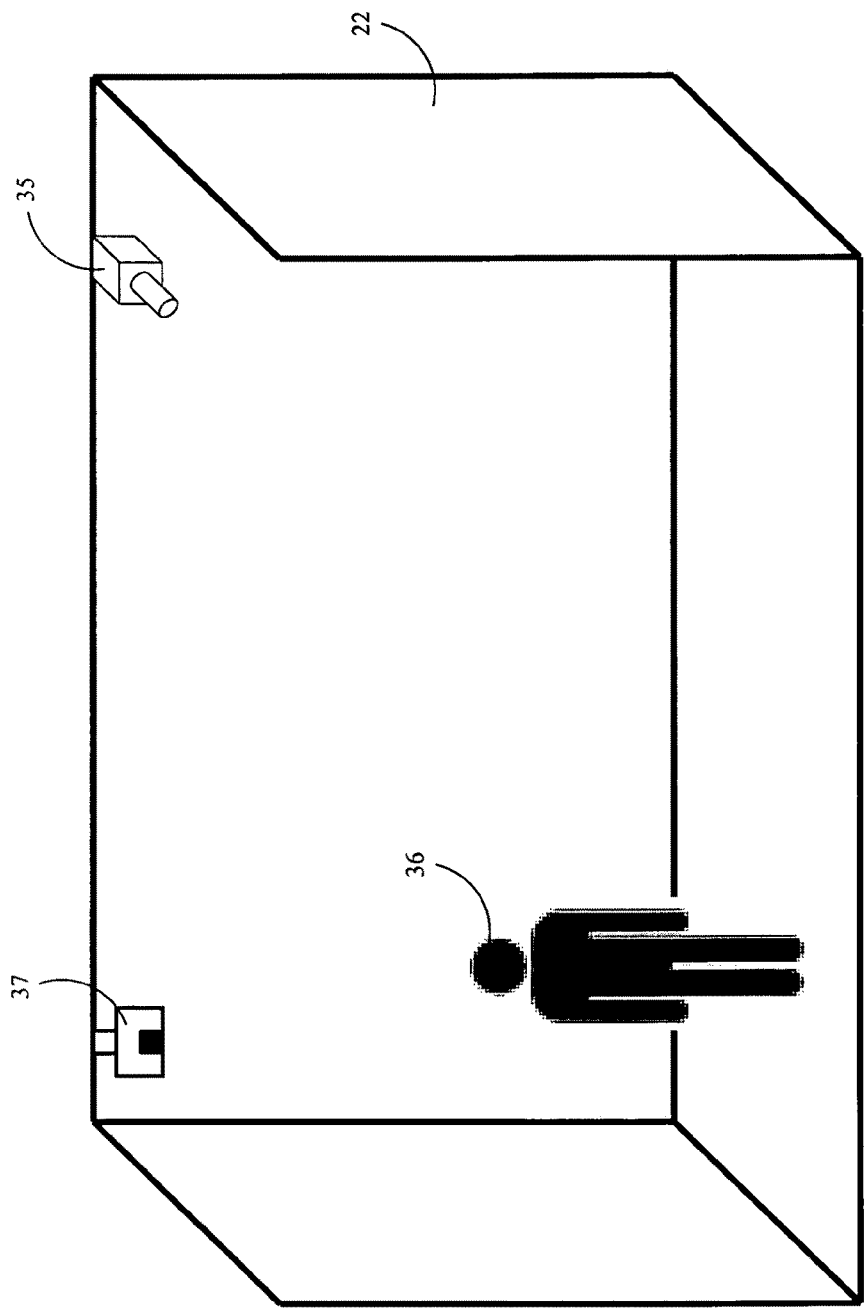
FIG. 5 is a perspective view of one embodiment of a video camera and motion detector system that can be used with the method and system described herein.

It is noteworthy that a video camera recording system (or similar type surveillance equipment) may be set up both inside and outside of the building structure 22 in order to provide a measure of added security for the property. The video camera system can function on either wired or wireless technology, and preferably operates on that of wireless. In this manner, the video camera may receive a wireless transmission from live personnel or computer system of the RSP to start monitoring and/or recording at the same or proximate time that the access code to the lockbox 23 is requested by or granted to the requesting individual. The wireless transmission would activate the video camera system and allow it to begin monitoring and/or recording. Alternatively, the video camera system can automatically start monitoring and/or recording at the same or proximate time that the lockbox 23 is opened. In this instance, the start monitoring and/or recording signal may be transmitted from the lockbox 23 through preferably wireless technology. As shown in FIG. 5, a video camera system 35 is set up inside a building structure 22 in which an individual 36 has entered. The video camera system 35 would continue to monitor and/or record footage until the key 28 is placed back into the lockbox 23, until the expiration of a predetermined time interval (such as 30 minutes), until the individual has left the building structure 22 (which can be determined by a live monitoring personnel at the RSP or by the computer equipment of the RSP), or until other predetermined conditions have been met.

Although one video camera is shown in FIG. 5, it is contemplated that several video cameras 35 can be positioned in strategic locations throughout the inside and/or outside of the building structure 22. For example, a video camera system can be set up at the front door for viewing and possibly recording an individual's entrance to and exit from the building structure 22. Similarly, video cameras can be set up in one or multiple locations inside the building structure to monitor and/or record the actions of the inspecting individual. Depending on the video camera system utilized, recorded footage will be saved in the camera system's data storage and/or transmitted (through wired or wireless technology) to a facility (such as the RSP or other monitoring authority/source) where personnel or electronic and/or computer equipment could monitor the footage on a real time basis or at a later time in which monitoring is desired.

In case the video camera monitoring and/or recordings reveal vandalism or other inappropriate conduct on the part of the individual who entered the building structure 22, appropriate measures can be taken, including, but not limited to sending a response unit to the building structure, opening an investigation into the matter, debiting the individual's account for damage they committed, notating negative feedback to the individual's account, blacklisting the individual from further access of other building structures, etc. Once the building structure has been sold or rented, the video camera system can be removed from the property and re-installed in an alternate one that is placed for sale or rental. Video camera monitoring and/or recording service may be provided by the RSP, the seller, lessor, a brokerage company, a third party business entity that specializes in such service(s), and/or any other business entity that can provide such service.

In addition to or instead of the video camera system, a motion detector system may likewise be installed inside and/or outside the building structure 22. As one example of this, FIG. 5 illustrates a motion detector 37 mounted in the upper left portion of the interior of building structure 22. Of course, one or multiple motion detectors can be mounted anywhere inside and outside of the building structure 22. The motion detector system can function on either wired or wireless technology and can be used to indicate when an individual is inside or outside of the building structure 22. Through the use of a motion detector system, it will be possible to ascertain when an individual has entered and left the inside of a building structure 22. Furthermore, the same can be ascertained with regards to the outside of the building structure 22.

Use of a motion detector system will aid in preventing vandalism or other damage to the property being inspected since presence of the inspecting individual(s) will be known. The motion detector system may be set up to communicate with the RSP, the seller, lessor, a brokerage company, a third party business entity that specializes in such service(s) such as ADT®, state and/or local authorities, and/or any other business entity that can provide such service. Upon detecting motion during suspicious occurrences, the motion detector system will alert the appropriate entity so the matter can be looked into. Times of suspicious motion detection may include, but are not limited to the following: when no access code has been granted and a grace period has lapsed, when the requesting individual has overstayed their inspection time limit, at times when inspection is not allowed (e.g. after hours). In a preferred embodiment, the motion detector system may be integrated with the video camera system in order to trigger monitoring and/or recording from the camera when any motion is detected. When motion is no longer detected (after a predetermined time period has lapsed), the detector system may trigger the monitoring and/or recording camera to the off or standby position.

In addition to or instead of the video camera surveillance system, an audio surveillance system may likewise be set up inside and/or outside the building structure 22 in order to provided added security to the building structure 22. The audio surveillance system my be integrated with the video surveillance system, the motion detector system or independent of either or both of them. Audio content that is picked up by the audio surveillance system may be recorded for storage as well as transmitted to the RSP or other appropriate monitoring facility in real time in order to monitor activity at the building structure 22.

The audio surveillance system can function on either wired or wireless technology, and preferably operates on that of wireless. In this manner, the audio equipment may receive a wireless transmission from live personnel or computer system of the RSP to start monitoring and/or recording at the same or proximate time that the access code to the lockbox 23 is requested by or granted to the requesting individual. The wireless transmission would activate the audio surveillance system and allow it to begin monitoring and/or recording. Alternatively, the audio surveillance system can automatically start monitoring and/or recording at the same or proximate time that the lockbox 23 is opened. In this instance, the start monitoring and/or recording signal may be transmitted from the lockbox 23 through preferably wireless technology. The audio surveillance system may continue to monitor and/or record audio feed until the key 28 is placed back into the lockbox 23, until the expiration of a predetermined time interval (such as 30 minutes), until the individual has left the building structure 22 (which can be determined by a live monitoring personnel at the RSP or by computer equipment of the RSP), or until other predetermined conditions have been met. In a preferred embodiment, the motion detector system may likewise be integrated with the audio surveillance system in order to trigger monitoring and/or recording from the audio detection equipment when any motion is detected. When motion is no longer detected (after a predetermined time period has lapsed), the detector system may trigger the monitoring and/or recording of the audio surveillance system to the off or standby position.

It is contemplated that several audio surveillance points can be positioned in strategic locations throughout the inside and/or outside of the building structure 22. For example, an audio surveillance system can be set up at the front door for picking up and possibly recording an individual's entrance to and exit from the building structure 22. Similarly, audio surveillance points can be set up in one or multiple locations inside the building structure to monitor and/or record the actions of the inspecting individual. Depending on the audio surveillance system utilized, recorded audio content will be saved in the audio system's data storage and/or transmitted (through wired or wireless technology) to a facility where personnel or electronic and/or computer equipment could monitor the audio content on a real time basis or at a later time in which monitoring is desired.

As a further added security measure, the RSP may initiate a predetermined inspection time limit (such as 15 minutes) which the individual would have to enter and inspect the building premises 22. The predetermined inspection time limit may begin when the motion detector system detects motion (if a motion detector system is utilized), after the access code is granted, or after the key 28 is removed from the inside compartment 27 of lockbox 23. Prior to expiration of that time period, the individual would be required to leave the building structure 22, lock it, and place the key 28 back into lockbox 23. This measure would function as a further security initiative which would work to limit the amount of time that the requesting individual has inside the building structure 22, thereby protecting against possible vandalism and other wrongdoing. In case the requesting individual fails to exit the building structure 22 after the expiration of the predetermined inspection time limit, various factors can occur. For example, an alarm may be sounded which would remind the accessing individual that they need to exit the property. The alarm may be generated from the lockbox 23 (if such is equipped with such a feature), a separate device attached to the property which can be remotely triggered by the RSP or lockbox 23 (after expiration of the predetermined time limit), etc. The alarm would cease to sound after the motion detector system ceases to detect further motion or the key 28 has been replaced back into lockbox 23. Another repercussion could entail a debit to the accessing individual's account for the time spent inside the property beyond the predetermined limit. Third, a call to the cellular phone of the accessing individual may likewise be made by a live representative or automated call system of the RSP. Finally, a mobile response unit may be sent to the building structure to investigate the matter.

Various factors to ensure that the inspecting individual has exited the property may include, but are not limited to the following: 1) Motion detector system (as previously described); 2) detection of the key 28 having been placed back inside the lockbox 23. Detection may be accomplished by detectors that are positioned or integrated with the lockbox 23; 3) A door lock sensor that can be installed into or integrated with the building structure's 22 door lock. Such a sensor may detect when a door has been unlocked as well as locked. Such door lock detector may be configured to communicate via wired and/or wireless technology to the lockbox 23, video recorder, and personnel/companies concerned with the security of the building structure 22 (such as the RSP, the seller, lessor, a brokerage company, a third party business entity that specializes in such service(s), State and local authorities, and/or any other interested business entity). Various mechanisms and/or sensors which are able to detect whether a door has been open and/or locked are best known to those skilled in the art. 4) A door lock that is able to communicate that it has been open and/or closed. The door lock would be installed on the building structure 22 entry door and may be configured to communicate via wired and/or wireless technology to the lockbox 23, video recorder, and personnel/companies concerned with the security of the building structure 22 (such as the RSP, the seller, lessor, a brokerage company, a third party business entity that specializes in such service(s), State and local authorities, and/or any other interested business entity). 5) A door lock that can provide for one time access to the building structure 22 for each issued access code or entry card. This door lock would likewise be installed on the building structure 22 entry door and may allow the door to be opened a set amount of times (preferably only once), and then-after, require the door to be locked at or before the end of a set amount of time. Once locked, the door may not be re-opened with the same access code or entry card. Thereafter, any unauthorized attempt to open the property door will be detected.

Returning back to FIG. 1, after the individual has finished inspecting the property 22, they may exit it and lock the door, block 18. Thereafter, the individual places the key 28 back inside the lockbox 23 and leaves the building structure, block 19. This cycle may repeat at different property locations which are placed for sale or rent, wherein the requesting individual's account may be debited for each access code granted.

Video and/or audio content that is recorded during an individual's inspection of a building structure 22, may also be made available to them for viewing and reviewing at a later time after the inspection is over. Individuals may want to review the video and/or audio content of the real estate property they inspected for various reasons, including, but not limited to the following: getting a subsequent look at the property, comparison of the property to other properties, showing the property to another individual, reviewing allegations of vandalism and/or misconduct during the inspection, etc.). Such video and/or audio content may be made available to the individual through a computer file download (via the Internet) from the location where such material is stored (e.g. the computer servers of the RSP or other storage facility/entity, the video and/or audio equipment itself, etc.). Additionally, such video and/or audio material of the inspection may be sent (e.g. mailed) to the individual on a data storage medium such as a CD ROM, computer disk, memory stick, or other media storage element. Similarly, the video and/or audio material may be e-mailed to an e-mail account designated by the requesting individual. While the video and/or audio content can be made available to the requesting individual or other entity at no cost, it may likewise be provided at a predetermined fee basis.

While the present invention has been described with respect to preferred embodiments thereof, such description is for illustrative purposes only, and is not to be construed as limiting the scope of the invention. Various modifications and changes may be made to the described embodiments by those skilled in the art without departing from the true spirit and scope of the invention as defined by the appended claims.

I claim:

1. A method for allowing an individual to inspect real estate property that has been placed for sale or rent, the real estate property having a lockbox located proximate to an entry to the real estate property, the lockbox housing a key for gaining access to the real estate property, said method comprising the steps of:
   a) establishing a user account for the individual in a computer system of a remote service provider;
   b) receiving a request at the remote service provider for allowing the individual to inspect the real estate property;
   c) using the computer system of the remote service provider to authenticate the request;
   d) debiting the individual's user account a fee for permitting access to the real estate property; and
   e) sending an approval signal from the remote service provider after authenticating the individual's request, the approval signal allowing the access key to be obtained from the lockbox.

2. The method recited by claim 1 wherein said method includes the step of providing video surveillance equipment at said real estate property for monitoring said individual's inspection of said real estate property.

3. The method of claim 1 wherein the lockbox has an access code for allowing the key to be obtained from the lockbox, and wherein the step of sending the approval signal from the remote service provider includes sending the access code to the requesting individual via a voice communication over a mobile phone.

4. The method of claim 1 wherein the lockbox has an access code for allowing the key to be obtained from the lockbox, and wherein the step of sending the approval signal from the remote service provider includes sending the access code to the requesting individual via a data communication to a mobile phone.

5. The method of claim 1, wherein the lockbox has an access code for allowing the key to be obtained from the lockbox, and the remote service provider sends the approval signal via a wireless data transmission to said lockbox.

6. The method of claim 2, wherein said video surveillance equipment is activated proximate to the time at which the request was received at the remote service provider for inspection of the real estate property access to said lockbox was requested.

7. The method of claim 2, wherein said video surveillance equipment is activated proximate to the time at which the remote service provider sends the approval signal that allows the individual to obtain the key from the lockbox.

8. The method of claim 2, wherein said video surveillance equipment is activated by at least one motion detector upon the detection of movement in a predetermined location associated with said real estate property, and wherein said video surveillance equipment is located inside the premises of said real estate property.

9. The method of claim 2, wherein said video surveillance equipment is located outside the premises of said real estate property.

10. The method of claim 2, wherein said video surveillance equipment further includes audio monitoring capabilities.

11. The method of claim 1, wherein said individual's user account is debited upon each authorized access request.

12. The method of claim 1, wherein: the lockbox includes an electronic keypad, said electronic keypad allowing for an account number and an identification code to be entered on the electronic keypad of the lockbox to send a request to the remote service provider.

13. The method of claim 1, wherein:
   a) the remote service provider receives user identification information that is sent from a cell phone as a request to inspect the real estate property;
   b) wherein said lockbox has an access code for allowing the key to be obtained from the lockbox; and
   c) the approval signal is an access code that is communicated back to said cell phone after authorization of the request.

14. The method of claim 1, wherein:
   a) the step of establishing a user account includes recording an email address for the individual; and
   b) sending an email message from the remote service provider to the individual after authenticating the individual's request said email message containing detailed information about said real estate property being inspected.

15. The method of claim 1, wherein, following authentication of the individual's request, the individual is allowed to inspect said real estate property for a predetermined amount of time.

16. The method of claim 15, wherein an alarm is sounded at said real estate property when the individual inspects the real estate property for longer than said predetermined amount of time.

17. The method of claim 15, wherein said requesting individual's user account is further debited when the individual inspects the real estate property for longer than said predetermined amount of time.

18. The method of claim 15, wherein said remote service provider sends a warning communication to the requesting individual to advise that said predetermined inspection time limit has been exceeded at said real estate property.

19. The method of claim 15, further including the step of sending a security response unit to said real estate property when the individual inspects said real estate property for longer than said predetermined amount of time.

20. The method of claim 1, further including the step of charging said requesting individual's user account for any damage caused to said real estate property while the individual was inspecting the real estate property.

21. The method of claim 20, further including the step of denying authentication of further requests from said requesting individual after determining that the individual has caused damage to real estate property.

22. A method for allowing an individual to inspect real estate property that has been placed for sale or rent, the real estate property having a lockbox located proximate to an entry to the real estate property, the lockbox housing a key for gaining access to the real estate property, said method comprising the steps of:
   a) establishing a user account for the individual in a computer system of a remote service provider;
   b) receiving a request at the remote service provider for allowing the individual to inspect the real estate property;
   c) using the computer system of the remote service provider to authenticate the request;
   d) debiting the individual's user account a fee for permitting access to the real estate property;
   e) sending an approval signal from the remote service provider after authenticating the individual's request, the approval signal allowing the access key to be obtained from the lockbox; and
   f) providing surveillance equipment at said real estate property for monitoring the requesting individual's inspection of the real estate property.

23. The method recited by claim 22 wherein said surveillance equipment comprises video equipment.

24. The method recited by claim 22 wherein said surveillance equipment comprises audio equipment.

25. A method for allowing an individual to inspect real estate property that has been placed for sale or rent, the real estate property including a keyless entry door lock, said method comprising the steps of:
   a) establishing a user account for the individual in a computer system of a remote service provider;
   b) receiving a request at the remote service provider for allowing the individual to inspect the real estate property;
   c) using the computer system of the remote service provider to authenticate the request;
   d) debiting the individual's user account a fee for permitting access to the real estate property; and
   e) sending an approval signal from the remote service provider after authenticating the individual's request, the approval signal allowing the keyless entry door lock to be opened.

26. The method as in claim 25, further including providing surveillance equipment at said real estate property for monitoring the requesting individual's inspection of the real estate property, wherein said surveillance equipment comprises video equipment.

27. The method as in claim 25, further including providing surveillance equipment at said real estate property for monitoring the requesting individual's inspection of the real estate property, wherein said surveillance equipment comprises audio equipment.

* * * * *